United States Patent Office.

JOHN CARR, OF THE CRESCENT, CLAPHAM, AND CHARLES LUCOP, OF DRUMMOND ROAD, ENGLAND.

*Letters Patent No. 76,889, dated April 21, 1868; patented in England, January 18, 1868.*

IMPROVEMENT IN THE MANUFACTURE OF MEAT AND OTHER BISCUIT.

The Schedule referred to in these Letters Patent and making part of the same.

TO ALL TO WHOM IT MAY CONCERN:

Be it known that we, JOHN CARR, of the Crescent, Clapham, in the county of Surrey, England, of the firm of Peek, Frean, and Company, and CHARLES LUCOP, of Drummond Road, also in the county of Surrey, aforesaid, one of the managers of the said firm, subjects of the Queen of Great Britain, have invented or discovered new and useful "Improvements in the Manufacture of Meat and other Biscuits;" and we, the said JOHN CARR and CHARLES LUCOP, do hereby declare the nature of the said invention, and in what manner the same is to be performed, to be particularly described and ascertained in and by the following statement thereof; that is to say, This invention has for its object improvements in the manufacture of meat and other biscuits.

In the manufacture of meat-biscuits it is very desirable that the meat-extract should not be exposed to the heat of the oven, but that the other ingredients of the biscuit should be baked separately, and the meat-extract afterwards added. We therefore, according to our invention, manufacture meat-biscuits in the following manner: We make plain biscuit, and bake it as usual, then we grind it to powder, and we mix the extract of meat with the powder. Afterwards, we mould the powder, which is hardly moistened by the extract, into a biscuit by heavy pressure or by stamping it in a suitable mould. Although we prefer to mix the extract of meat with powdered biscuit, other materials, such, for example, as baked flour, may be substituted for the biscuit, but less advantageously. This method of making biscuits is also applicable advantageously when extract of meat is not employed, but where it is required to incorporate in the biscuits other materials which might be injured by the heat of the oven.

And in order that our said invention may be most fully understood and readily carried into effect, we will proceed to describe the manner in which we prefer to conduct the manufacture.

We take biscuits made with butter, such as are known as butter-biscuits, and we grind them to a coarse powder, either in a mill, such as is used by grocers for grinding coffee, or, if the operation is conducted on a large scale, millstones may be employed.

We then mix with the biscuit-powder Liebig's extract of meat, in such proportion that each pound of the mixture may contain an ounce and a half of the extract. The mixture should be thoroughly and carefully made in a stone or other non-metallic vessel. We employ a large pestle and mortar, the pestle being worked by steam-power, as is sometimes practised in mixing drugs, but, on a smaller scale, a hand-pestle and mortar may be employed. The moulds which we employ consist of cylindrical holes, each about an inch and three-quarters in diameter, bored in a block of cast iron. Into each hole a plunger is fitted, so as to be able to move up and down in the hole. To close the upper ends of the moulds, a cover-plate is provided and fitted truly to the top of the block. The plungers and cover-plates are engraved with the devices, if any, which it is desired to obtain on the surfaces of the biscuits. Into each of the moulds, when the plunger is down, there is poured, say a quarter of an ounce of the mixture already prepared, and which is still a powder, and apparently dry. It is convenient to let the plungers, which are in fact movable bottoms to the moulds, descend on to a stop-plate or set-screws, so placed that the capacity of each mould may, when the plungers are down, be such as to contain the proper quantity of powder, then to fill all the moulds and strike off any excess from the surface of the mould-block. The cover-plate is now applied and secured, and the whole arrangement is placed in a hydraulic press, the plungers resting on the ram of the press, and they are forced up by it until the pressure on each square inch of biscuit becomes about one ton, or more or less, according to the degree of firmness it is desired to give to the biscuits. The pressure is then let off, the moulding-apparatus is removed from the press, and the cover-plate is taken off. Each plunger is now lifted to its highest position, so as to cause it to carry the moulded biscuit out of the cylindrical hole in which it is formed, and the biscuits are then removed from the plungers by hand. They are dried for about three-quarters of an hour in a hot closet, at a temperature of about 190°, and are then finished.

Any number of moulds may be worked at one time which the power of the press will admit.

We would remark that the details of the process, and the apparatus employed therein, may be much varied, but those which we have described are convenient.

We employ the same method when making biscuits with preserved fruits, the materials which require baking going into the ovens by themselves, and afterwards in a powdered state being mixed with the jam, or jelly, or other preserve, and formed into biscuits by pressure and without injurious heat.

Cheese may be employed in a similar manner; and with cheese we operate in the following manner: We finely powder the biscuit, and also the cheese, but without mixing them. We place about half the biscuit-powder required to make a biscuit into the mould; we then compress slightly in a smaller cylinder the requisite quantity of cheese, grated or otherwise, and afterwards place it on the powder in the biscuit-mould. The remainder of the biscuit-powder is put into the mould, and the pressure is applied, as before. In this way a biscuit is made with the cheese enclosed in the centre.

What we claim, is—

The manufacture of meat and other biscuits by first baking such of the ingredients of the biscuit as require to be baked, then adding extract of meat or such other of the ingredients of the biscuit as would be injured by the heat of the oven, and forming the whole into biscuits by pressure or force applied to the ingredients whilst they are contained in moulds, substantially as hereinbefore described.

JOHN CARR,
CHARLES LUCOP.

Witnesses:
G. F. WARREN,
T. L. WARNER,
} Both of No. 17 Gracechurch Street, London.